March 12, 1929. M. A. GILL 1,705,154
OUTSIDE FEEDING DEVICE
Filed Aug. 6, 1926
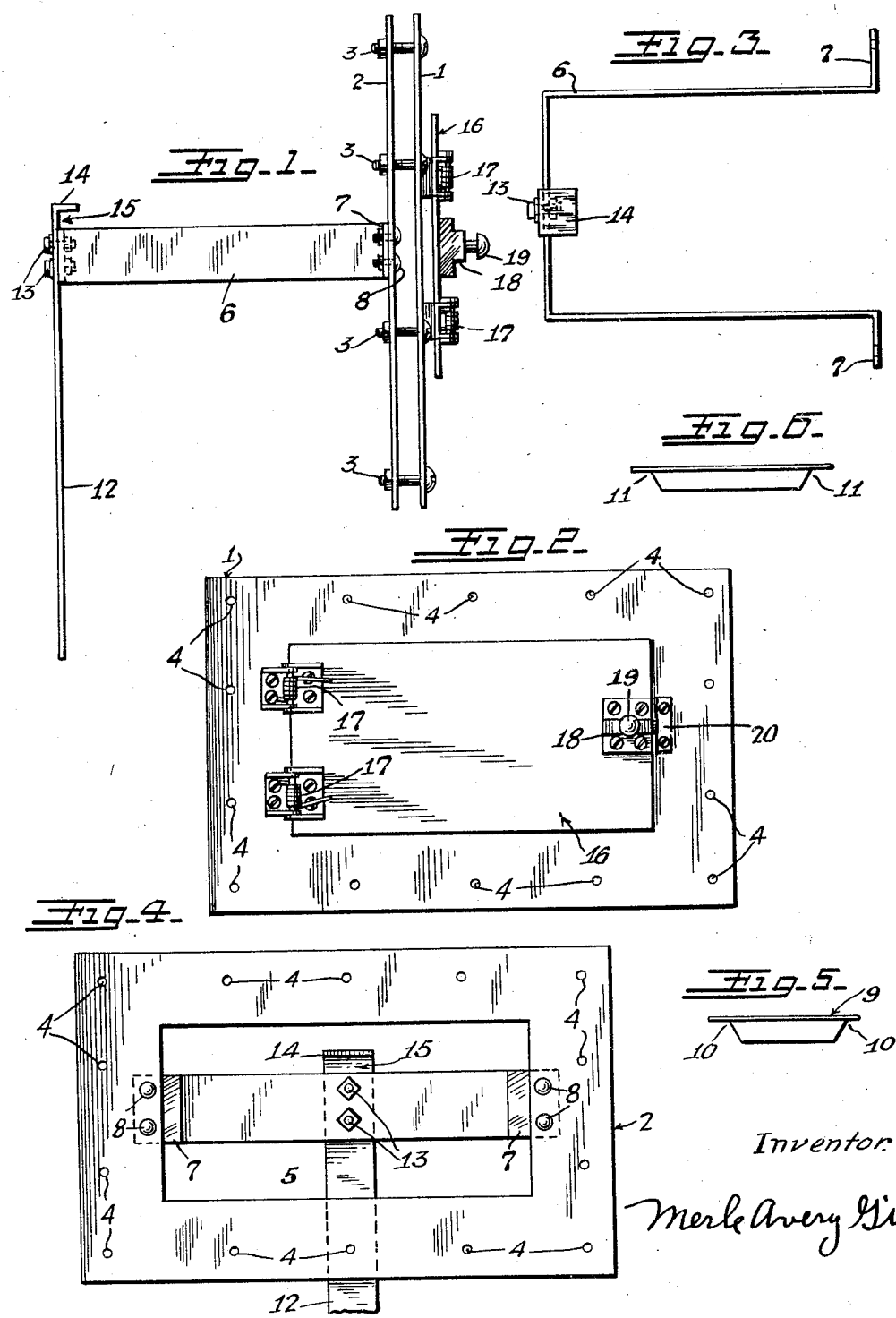
Inventor.
Merle Avery Gill.

Patented Mar. 12, 1929.

1,705,154

UNITED STATES PATENT OFFICE.

MERLE AVERY GILL, OF PINEWOOD, MINNESOTA.

OUTSIDE FEEDING DEVICE.

Application filed August 6, 1926. Serial No. 127,566.

The object of the invention is to do away with the old method of going on the inside of the enclosures where the animals are raised and placing the feed and water pans on the ground.

A further object of the invention resides in the provision of a means to slide a pan particularly adapted to the feeding of small fur bearing animals such as raccoons, mink, skunks, foxes and fowls. To slide this said pan through a gate, the gate having spring hinges and a spring cabinet snap mounted on it, closes and locks automatically when released by the hand, thereby making it impossible for the attendant to forget to close the gate, or the animals to escape through the opening of the feeder where the pan slides in on the pan rack.

With the above and other objects in view the invention consists in the details of construction and in the arrangement and combination of parts to be hereinafter more fully described and particularly pointed out in the following specifications and claim.

In describing the invention in detail references will be had to the accompanying drawing wherein like characters of reference denote corresponding parts in the several views, in which:—

Figure 1 is a side view of the entire feeder without the pan. Figure 2 is a front view of the outside plate showing gate attached to plate with spring hinges and cabinet snap. Figure 3 is a top view of the pan rack. Figure 4 is a front view of the back plate that goes on the inside of the enclosure. The pan rack is mounted to the back side of this plate. Figures 5 and 6 show, respectively, an end and side view of the type of pan used in the feeder.

The feeder is made of galvanized steel with the exception of the spring hinges and cabinet snap, which are made of brass.

The wire netting, or other material forming the side of pen or enclosure where the feeder is to be placed, is bolted between two steel plates used as supporting structures as in Figure 1, 1 and 2. Figure 2, 1 is the outside plate, and Figure 4, 2 is the inside plate. Fourteen holes, 3/16 inch in diameter, are drilled in each plate 1 and 2. The holes are drilled 1/2 inch from the outside edge of the plates and 3/16 inch stove bolts, 1/2 inch long, are used to bolt plates 1 and 2 together.

An oblong hole Figure 4, 5 is cut in each plate 1 and 2 to allow the feed or water pan to slide in on the pan rack, Figure 3, 6. This pan rack is made of 18-gauge band steel, 1-1/4 inches wide. A right angle bend, Figure 3, 7, 7, is made on each end of rack that bolts to plate 2; 7 7 of rack bolting to plate 2 at 8. One-quarter inch of right angle bends 7 7 projects in from each side of hole 5 to allow clearance for the pan rim, Figure 5, 9, to slide in on rack without binding on the sides of hole 5. The inside dimensions of rack 6 are 5-3/4 inches wide by 10 inches long. The outside dimensions of the pan, under the rim, are the same as the inside dimensions of the pan rack, Figure 3, 6. The rim around the edge of the pan is 1/8 inch wide and prevents the pan from dropping through the rack to the ground.

There is a tail piece, Figure 1, 12, which bolts to rack 6 at 13. The tail piece is also made of 18-gauge band steel, 1-1/4 inches wide and 12 inches long. The tail piece has a right angle bend at the top, Figure 1, 14. When the tail piece is bolted to the back of the rack as in Figure 3, 13, the right angle bend projects in over the rack and prevents the pan from being clawed out of the back of the rack by the animals. The bend is 1/4 inch above rack 6 when bolted at 13 as in Figure 1, 15. The lower part of tail piece 12 is inserted in the ground a sufficient distance to make pan rack level and helps to steady the feeder, when mounted direct in the wire. The feeder can be mounted to a post from the right or left side by screws through holes 4 in plates 1 and 2, tail piece still being necessary however, to keep pan from being clawed out of rack.

On the outside of plate 1 the gate of the feeder is mounted. Coil spring hinges are bolted to the gate, then to the plate as in Figure 2, 17 17. The coil spring hinges are made of brass and are 1-1/4 inches wide by 1-5/8 inches long. A spring cabinet snap, Figure 2, 18, is mounted on the opposite side of the gate. The spring of the snap is on the inside of the snap and around the bolt 21. The bolt 21 is operated by turning the knob 19 to the right or left. A catch, Figure 2, 20, is bolted to plate 1 to receive the bolt 21. When the gate is released by the hand the spring hinges slam the gate closed and the bolt 21 in striking the catch 20 is forced back in the snap 18 and when the bolt passes the inside edge of the catch 20, the bolt slides out again under the catch, thereby making it impossible to open the gate until the knob 19 on the snap 18 is turned by the hand.

What is claimed is:—

An outside feeding device for fur bearing animals, or fowls, comprising two supporting steel plates having an opening in each plate for the pan to slide in on the pan rack, which rack is mounted to the inside plate, a gate mounted to the outside plate with coil spring hinges and cabinet snap to close and lock gate when gate is released by the hand, preventing the pan from being removed through the outside of the feeder until the gate is opened, also preventing the gate from being opened from the inside of the enclosure, permitting escape of the animals, or fowls, a tail piece mounted to the back of the pan rack, with a small right angle bend, which right angle bend extends in over the rim of the pan when pan is in the rack, from the back of the feeder, the said tail piece extending down from the pan rack, and being inserted into the ground to help steady the feeder when mounted directly in the wire or wall of the enclosure, the said tail piece also being capable of being bent to the proper height, if the floor of the enclosure is of wood, rocks or cement.

In testimony whereof I affix my signature.

MERLE AVERY GILL.